(12) United States Patent
Kawasaki et al.

(10) Patent No.: US 10,404,115 B2
(45) Date of Patent: Sep. 3, 2019

(54) ROTARY ELECTRIC MACHINE

(71) Applicant: MITSUBISHI ELECTRIC CORPORATION, Chiyoda-ku, Tokyo (JP)

(72) Inventors: Sachiko Kawasaki, Tokyo (JP); Kimiyasu Furusawa, Tokyo (JP); Atsushi Sakaue, Tokyo (JP); Akira Hashimoto, Tokyo (JP); Hiroyuki Akita, Tokyo (JP); Moriyuki Hazeyama, Tokyo (JP); Masaya Inoue, Tokyo (JP); Shinji Nishimura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 287 days.

(21) Appl. No.: 15/038,851

(22) PCT Filed: Dec. 15, 2014

(86) PCT No.: PCT/JP2014/083142
§ 371 (c)(1),
(2) Date: May 24, 2016

(87) PCT Pub. No.: WO2015/104956
PCT Pub. Date: Jul. 16, 2015

(65) Prior Publication Data
US 2016/0380492 A1 Dec. 29, 2016

(30) Foreign Application Priority Data
Jan. 8, 2014 (JP) .................................. 2014-001681

(51) Int. Cl.
H02K 1/27 (2006.01)
H02K 1/14 (2006.01)
H02K 21/16 (2006.01)

(52) U.S. Cl.
CPC ............ H02K 1/2766 (2013.01); H02K 1/146 (2013.01); H02K 21/16 (2013.01); H02K 2213/03 (2013.01)

(58) Field of Classification Search
CPC .......... H02K 1/146; H02K 1/165; H02K 1/27; H02K 1/2766; H02K 21/16; H02K 21/02; H02K 21/24; H02K 2213/03
(Continued)

(56) References Cited

U.S. PATENT DOCUMENTS 7,057,322 B2 * 6/2006 Araki .................. H02K 1/2766
310/156.09
7,518,277 B2 * 4/2009 Nemoto ................. H02K 29/03
310/156.45

(Continued)

FOREIGN PATENT DOCUMENTS

JP 4027591 B2 12/2007
JP 2008-104353 A 5/2008
(Continued)

OTHER PUBLICATIONS

International Search Report (PCT/ISA/210) dated Mar. 17, 2015, by the Japanese Patent Office as the International Searching Authority for International Application No. PCT/JP2014/083142.
(Continued)

*Primary Examiner* — Julio C. Gonzalez
*Assistant Examiner* — Rashad H Johnson
(74) *Attorney, Agent, or Firm* — Buchanan Ingersoll & Rooney PC

(57) ABSTRACT

A contour line on the outer circumferential side of each magnet hole in the first layer is formed to be an arc passing (Continued)

through a total of three intersections, i.e., an intersection of a d axis and a reference magnetic flux line which is a magnetic flux line as a reference positioned inward by a predetermined number of magnetic flux lines from the outer circumferential edge of a rotor core, and intersections of: the reference magnetic flux line; and sides at the circumferential ends of the magnet hole which are positioned inward by a bridge dimension from the outer circumferential edge of the rotor core. Thus, a rotary electric machine that enables maximum utilization of reluctance torque and magnet torque and suppression of torque ripple can be obtained with simple processing and low cost.

8 Claims, 12 Drawing Sheets

(58) Field of Classification Search
USPC .................................. 310/156.32, 156.11
See application file for complete search history.

(56) References Cited

U.S. PATENT DOCUMENTS

| | | | | |
|---|---|---|---|---|
| 2006/0170301 | A1* | 8/2006 | Masuzawa | H02K 1/276 310/156.53 |
| 2008/0258573 | A1* | 10/2008 | Kamiya | B60K 6/26 310/156.02 |
| 2009/0033174 | A1 | 2/2009 | Niguchi et al. | |
| 2009/0224621 | A1* | 9/2009 | Okubo | H02K 1/278 310/156.25 |
| 2009/0261679 | A1* | 10/2009 | Sakai | H02K 1/276 310/156.53 |

FOREIGN PATENT DOCUMENTS

| | | |
|---|---|---|
| JP | 2008-136298 A | 6/2008 |
| JP | 2009-033927 A | 2/2009 |
| JP | 2009-044893 A | 2/2009 |
| JP | 4900132 B2 | 3/2012 |

OTHER PUBLICATIONS

Written Opinion (PCT/ISA/237) dated Mar. 17, 2015, by the Japanese Patent Office as the International Searching Authority for International Application No. PCT/JP2014/083142.

Office Action (The First Office Action) dated Oct. 10, 2017, by the State Intellectual Property Office (SIPO) of the People's Republic of China in corresponding Chinese Patent Application No. 201480068467. 8, and an English Translation of the Office Action. (9 pages).

\* cited by examiner

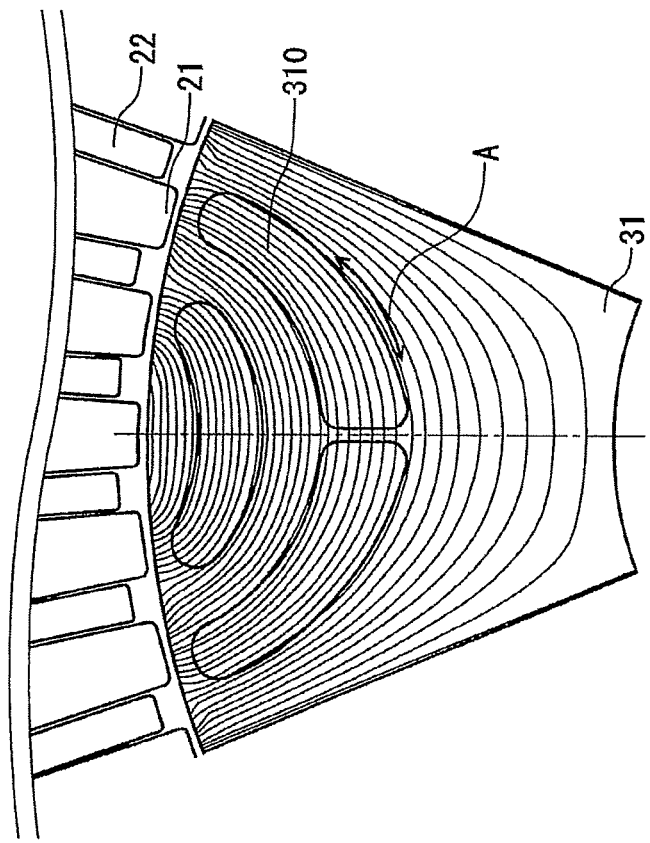
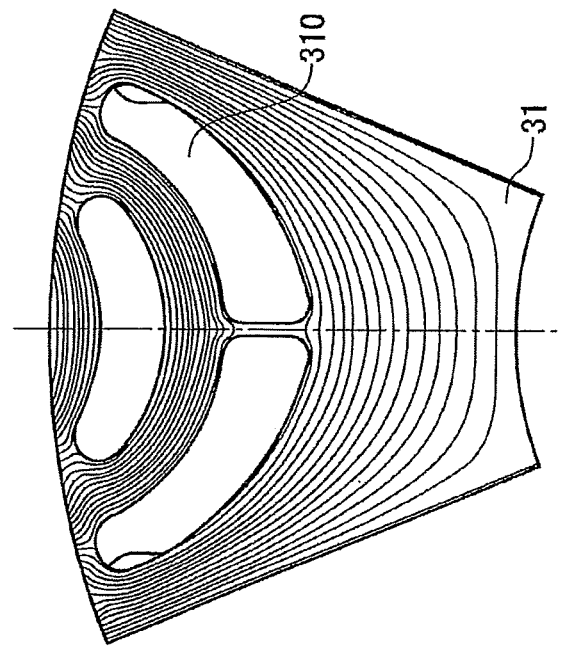

ROTARY ELECTRIC MACHINE

TECHNICAL FIELD

The present invention relates to a rotary electric machine that includes a stator and a rotor which includes a rotor core having a plurality of magnetic poles formed by permanent magnets inserted in magnet holes formed at regular intervals in the circumferential direction, and particularly, the present invention is to achieve both of improvement in the property of the rotary electric machine and facilitation in processing thereof.

BACKGROUND ART

Conventionally, some rotary electric machines utilize both magnet torque and reluctance torque in order to generate high torque over a wide range of rotation rates. Particularly, the reluctance torque is torque caused by the difference between inductance Ld in the direction (d axis) of the center line of a rotor magnetic pole and inductance Lq in the direction (q axis) of the center line between magnetic poles, and the caused torque increases with increase in the difference therebetween.

As technology for greatly increasing reluctance torque and improving the motor power factor, for example, Patent Document 1 relates to a synchronous reluctance motor having multilayer slits provided in a rotor core to form a plurality of belt-like magnetic paths. Patent Document 1 discloses a synchronous reluctance motor in which a contour line of each belt-like magnetic path roughly coincides with any of curves f(x, y)=c on an x-y plane represented by f(x, y)=Im($z^{P/2}$)=C in an x-y coordinate system corresponding to a cross section perpendicular to the motor rotation axis and having an origin coinciding with the motor rotation axis, where P is the number of poles of a rotor, z=x+iy, $i^2$=−1, Im(w) is an imaginary part of a complex number w, and c is any constant that is a real number.

Here, the belt-like magnetic paths or the slits are formed such that the contour lines thereof have boomerang shapes or hyperbola shapes. In the reluctance motor, the slit shapes are made to have an equal width, and permanent magnets are embedded in some or all of the slits, whereby the power factor is supposed to be improved.

For example, Patent Document 2 relates to a rotor having two or more slit portions in which permanent magnets are provided and which are provided at each pole so as to form layers in the radial direction, wherein the rotor rotates under a rotating magnetic field from a stator, in order to effectively utilize both magnet torque and reluctance torque and highly maintain the core usage rate for a magnetic path. Patent Document 2 discloses a rotor for a rotary electric machine, in which: the widths at the ends and the center of a core portion between the layers of the slit portions in which the permanent magnets are provided are set such that the magnetic flux density in the core portion is uniformed; the contour of the core portion has a shape formed by two opposite arcs on the inner circumferential side and the outer circumferential side; the center of curvature of the arc on the outer circumferential side is positioned outward in the radial direction of the rotor relative to the center of curvature of the arc formed in the opposite arc shape on the inner circumferential side; and the following relationship is satisfied:

$$\tfrac{1}{3}\times(r2-r1) < a < \tfrac{2}{3}\times(r2-r1)$$

where r1 is the radius of curvature of the arc on the outer circumferential side, r2 is the radius of curvature of the arc on the inner circumferential side, and a is the distance between the centers of curvature.

CITATION LIST

Patent Document

Patent Document 1: Japanese Patent No. 4027591
Patent Document 2: Japanese Patent No. 4900132

SUMMARY OF THE INVENTION

Problems to be Solved by the Invention

In Patent Document 1, since the contour line of the belt-like magnetic path is along a magnetic flux line, magnetic distortion is suppressed and an excellent torque property is highly expected.

However, in the rotor of the synchronous reluctance motor in which permanent magnets are embedded, a part of the contour line of the slit is formed in a hyperbola shape or a boomerang shape, and the embedded permanent magnet also has the corresponding shape. In the case of providing the permanent magnet and the rotor core for realizing the above rotor, the following problem arises.

That is, generally, a normal permanent magnet is obtained through a process in which the magnet is molded in a mold having substantially a product shape and then the outer periphery thereof is polished by a whetstone to be completed into a final product shape. The processing with the mold and the whetstone in the above process is complicated processing using numerical control or the like. Therefore, there are problems that dimension management is difficult and the processing cost is high. Similarly, also in processing of a mold for stamping the slit shape in the rotor core, processing for a complicated shape that is a hyperbola shape is required, leading to a problem of increasing the processing cost.

On the other hand, in the rotor of a rotary electric machine disclosed in Patent Document 2, the widths at the ends and the center of the core portion between the layers of the slit portions in which the permanent magnets are provided are set such that the magnetic flux density is uniformed. Therefore, although a certain effect may be expected in terms of the core usage rate, a magnetic path passing through the above core portion is not along the original magnetic path (which has a hyperbola shape with asymptotes formed by an angle corresponding to one magnetic pole) of a sinusoidal magnetic flux, and therefore the magnetic flux is disturbed and a fundamental wave of a magnetomotive force is not sufficiently obtained. As a result, there are problems that torque (both magnet torque and reluctance torque) is not sufficiently obtained, a harmonic occurs, and a torque ripple increases.

The present invention has been made to solve the above problems, and an object of the present invention is to obtain a rotary electric machine with simple processing and low cost, which enables maximum utilization of reluctance torque and magnet torque and suppression of torque ripple.

Solution to the Problems

A rotary electric machine according to the present invention includes a stator and a rotor. The rotor includes a rotor core having a plurality of magnetic poles formed by inserting permanent magnets into magnet holes formed at regular intervals in a circumferential direction. In the case where a magnetic flux flowing along a d axis corresponding to a direction of a center line of each magnetic pole is defined as a d-axis magnetic flux, and a magnetic flux flowing along a q axis corresponding to a direction of a center line between the magnetic poles is defined as a q-axis magnetic flux, a contour line along the circumferential direction of each magnet hole in a cross section perpendicular to a rotation axis of the rotor is formed to be an arc passing through three intersections at which one of magnetic flux lines of the q-axis magnetic flux intersects with a circumferential-center line and circumferential-end sides of the magnet hole.

Effect of the Invention

In the rotary electric machine according to the present invention, as described above, the contour line of each magnet hole is formed in an arc shape, whereby the mold processing cost is reduced and a rotary electric machine can be obtained with low cost. In addition, owing to the arc shape, dimension management is facilitated, so that unit variation among the rotary electric machines can be suppressed.

In addition, the contour line of each magnet hole, which is formed in an arc shape, is matched with a trajectory of a magnetic flux line of the q-axis magnetic flux at least at three points of the contour line, and therefore is almost along the magnetic flux line. Thus, reluctance torque and magnet torque can be maximally utilized and torque ripple can be suppressed.

BRIEF DESCRIPTION OF THE DRAWINGS

FIGS. 2(A) and 2(B) are an analysis result showing the distribution of magnetic flux lines in a rotor core.

DESCRIPTION OF EMBODIMENTS

Embodiment 1

Figure 1:
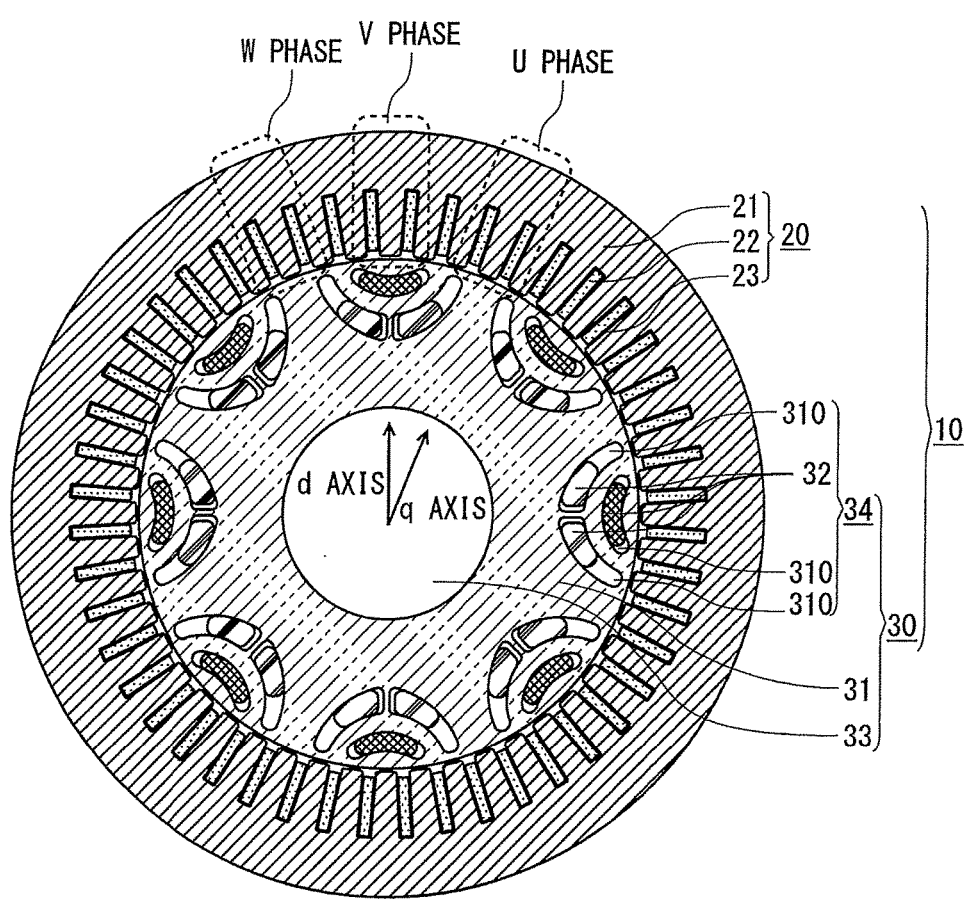
FIG. 1 is a sectional view (along a plane perpendicular to the rotation axis of a rotor) of a rotary electric machine according to embodiment 1 of the present invention.

FIG. 1 is a sectional view along a direction perpendicular to the rotation axis of a rotary electric machine according to embodiment 1 of the present invention. A rotary electric machine 10 is a permanent magnet rotary electric machine in which the number of poles is eight and the number of slots is forty-eight, and includes a stator 20 having a stator winding 22, and a rotor 30 provided with permanent magnets for eight poles. The stator 20 is fitted to a fixation frame made of iron, aluminum, or resin, and the rotor 30 is positioned on the inner circumferential side via a predetermined gap from the stator 20, and is fixed to a frame (which may be integrated with the frame for the stator 20, or may be a separate frame) via a bearing so as to be coaxial with the stator 20.

The stator 20 includes a stator core 21 formed of a plurality of stacked thin magnetic sheets, and the stator winding 22 wound on the stator core 21 via an insulating member 23. The stator 20 shown in FIG. 1 has three-phase distributed windings as an example. For example, the windings are linked per six slots, and U phase, V phase, and W phase are separated from each other by 120 degrees in electric angle (in terms of slot, at intervals of two slots).

The stator winding 22 is formed by, for example, inserting a coil made in a segment form from the inner side of the stator core 21.

As in the stator 20, the rotor 30 includes a rotor core 31 formed of a plurality of stacked thin magnetic sheets. The rotor core 31 is fixed to a rotary shaft 33. Although described later in detail, in the rotor core 31 in FIG. 1, a total of three magnet holes 310 are formed in two layers in the radial direction, such sets of magnet holes 310 are arranged at regular intervals in the circumferential direction, and permanent magnets 32 are inserted into the magnet holes 310 to form magnetic poles 34.

In FIG. 1, the magnet holes 310 are formed in two layers, and two divided magnet holes 310 are formed on the inner circumferential side. However, the number of the layers or whether to divide the magnet holes is not limited thereto.

The shape of the contour line of each magnet hole 310 along the circumferential direction is formed along magnetic flux lines of a q-axis magnetic flux flowing along a q axis corresponding to the direction of the center line between the magnetic poles 34, whereby a difference occurs between inductance Ld on the d axis corresponding to the direction of the center line of the magnetic pole 34 and inductance Lq on the q axis, and thus reluctance torque can be utilized.

In order to obtain reluctance torque, it is necessary to apply phase current having a leading phase to the stator winding 22 of the stator 20. That is, by applying d-axis current id in addition to q-axis current iq needed for obtaining magnet torque, reluctance torque $(Lq-Ld)id \cdot iq$ can be obtained. The d axis and the q axis shown in FIG. 1 have a phase difference from each other by 90 degrees electrically.

The configuration of the rotor 30 for efficiently obtaining magnet torque and reluctance torque will be described in more detail.

In order to efficiently obtain magnet torque and reluctance torque, it is necessary to suppress distortion of a magnetic flux (rotor magnetic flux=d-axis magnetic flux) generated by a magnet (permanent magnet) and distortion of a magnetic flux (q-axis magnetic flux) generated by the stator, and make the magnetic flux distribution in the gap into a sinusoidal shape. If the magnetic flux is distorted and a harmonic component is superimposed in the magnetic flux distribution, the harmonic component does not contribute to torque.

This corresponds to setting the shape of the contour line of each magnet hole 310 along the direction of the magnetic flux line of the q-axis magnetic flux generated by the stator 20. The magnetic flux line generated by the stator 20 of a distributed-winding type has a shape close to a hyperbola shape having the q axis as asymptotes, or such a boomerang shape, and the distribution of the density of the magnetic flux passing through the gap has substantially a sinusoidal shape.

FIGS. 2(A) and 2(B) are an analysis result showing the distribution of the magnetic flux lines in the rotor core 31. FIG. 2(A) is a diagram in which the rotor core 31 of the present embodiment 1 is drawn in an overlaid manner on the magnetic flux lines of the q-axis magnetic flux obtained when the magnet holes 310 are not formed in the rotor core 31.

As shown by an arrow A in FIG. 2(A), the shapes of the contour lines of the magnet holes 310 formed in two layers in the rotor core 31 are substantially along magnetic flux lines of the d-axis magnetic flux.

Figure 8:
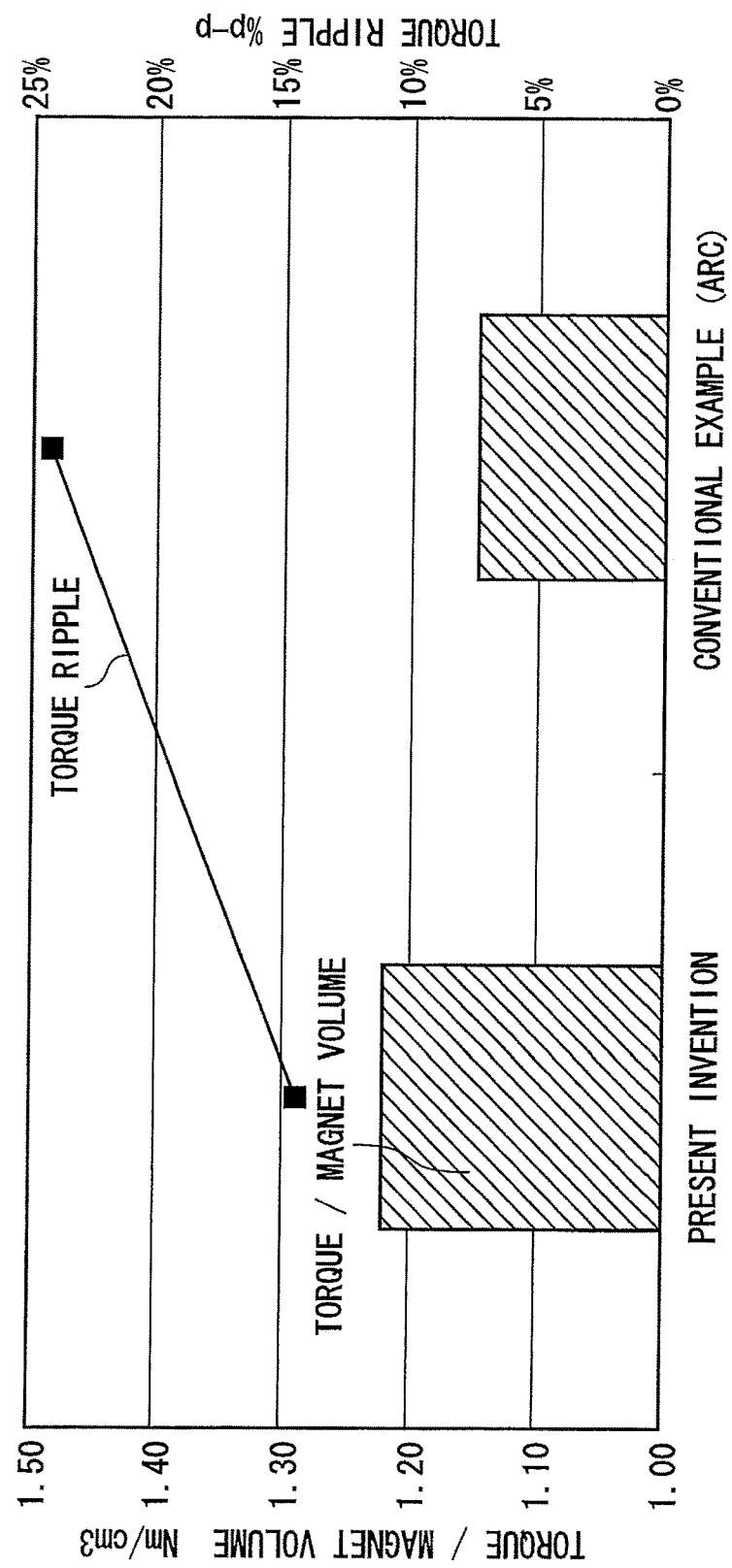
FIG. 8 is a graph showing comparison of torque and torque ripple of a rotary electric machine between the case of using the rotor according to embodiment 1 of the present invention and the case of using a conventional rotor.

Actually, the magnetic flux hardly flows in the magnet holes 310 but the corresponding magnetic flux flows into the core portion. Therefore, the actual distribution of the magnetic flux lines is as shown in FIG. 2(B), unlike FIG. 2(A). However, as is found from comparison therebetween, in the case where the magnet holes 310 are formed along the magnetic flux lines obtained on the assumption that the magnet holes 310 are not formed, the magnet holes 310 do not disturb the other magnetic flux lines, and eventually, the magnetic flux lines passing through the core portion are matched with the magnetic flux lines of the q-axis magnetic flux, so that the distribution thereof hardly changes even in the actual case. Thus, it can be said that the magnetic flux is not distorted. This is also verified in FIG. 8 showing comparison of obtained torques with the conventional art as described later.

Next, based on the above concept, a specific manner for forming the magnet holes 310 in the rotor core 31 will be described with reference to FIG. 3.

Figure 3:
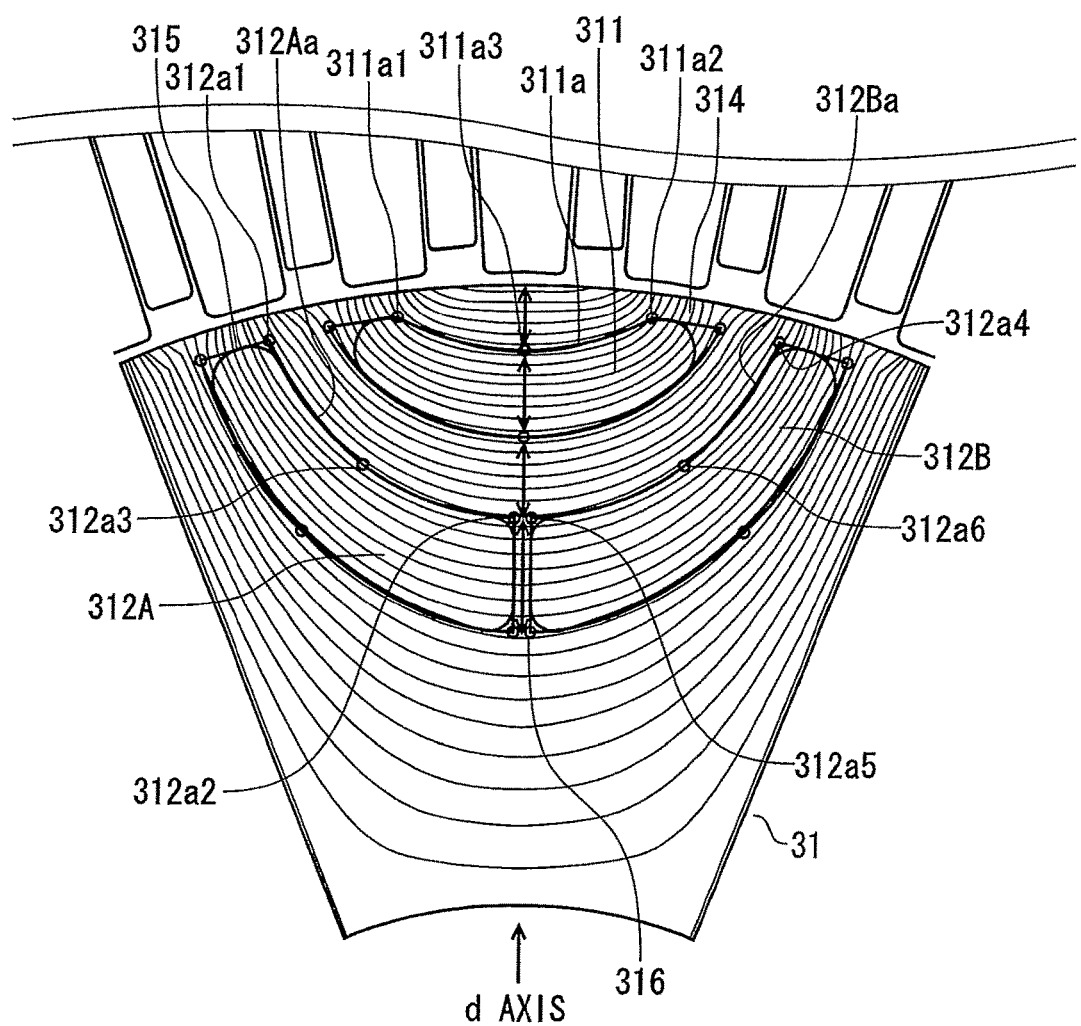
FIG. 3 is a diagram for explaining the manner for determining the shape of a magnet hole.

In FIG. 3, a magnet hole 311 is formed in the first layer as counted from the outer circumferential side, and a pair of a first hole 312A and a second hole 312B divided symmetrically with respect to the d axis are formed in the second layer.

First, a contour line 311$a$ on the outer circumferential side of the magnet hole 311 in the first layer is formed to be an arc passing through a total of three intersections, i.e., an intersection 311$a$3 of a circumferential-center line (here, coinciding with the d axis) of the magnet hole 311 and a reference magnetic flux line which is a magnetic flux line as a reference positioned inward by a predetermined number of magnetic flux lines described later from the outer circumferential edge of the rotor core 31, and intersections 311$a$1 and 311$a$2 of: the reference magnetic flux line; and sides at the circumferential ends of the magnet hole 311 which are positioned inward by a bridge 314 dimension described later from the outer circumferential edge of the rotor core 31.

An arc passing through the three points is uniquely specified, and by these three points distributed over the entire circumferential region including the center and both ends of the magnet hole 311, it is ensured that the contour line of the magnet hole 311 is positioned on the same reference magnetic flux line described above. Therefore, it can be said that the contour line along the circumferential direction of the magnet hole 311 is along the magnetic flux lines of the q-axis magnetic flux, with sufficiently high accuracy.

Since the magnet hole 311 has an arc shape, for example, the magnet hole 311 can be processed by an inexpensive lathe, and as described above, an inexpensive rotary electric machine can be obtained with the mold processing cost reduced. In addition, owing to the arc shape, the dimension management is facilitated and unit variation among the rotary electric machines can be suppressed.

Although reference characters are not shown in the drawing for avoiding complication, similarly, a contour line 311$b$ on the inner circumferential side of the magnet hole 311 in the first layer is formed to be an arc passing through a total of three intersections, i.e., an intersection 311$b$3 of a circumferential-center line of the magnet hole 311 and a reference magnetic flux line which is a magnetic flux line as a reference positioned further inward by a predetermined number of magnetic flux lines from the contour line 311$a$ on the outer circumferential side, and intersections 311$b$1 and 311$b$2 of: the reference magnetic flux line; and sides at the circumferential ends of the magnet hole 311 which are positioned inward by the bridge 314 dimension from the outer circumferential edge of the rotor core 31.

Next, a contour line 312Aa on the outer circumferential side of the first hole 312A which is one of the magnet holes in the second layer is formed to be an arc passing through a total of three intersections, i.e., an intersection 312$a$3 of a circumferential-center line of the first hole 312A and a reference magnetic flux line which is a magnetic flux line as a reference positioned further inward by a predetermined number of magnetic flux lines from the contour line 311$b$ on the inner circumferential side of the magnet hole 311 in the first layer, an intersection 312$a$1 of the reference magnetic flux line and a side that is a circumferential-end edge of the first hole 312A and is positioned inward by a bridge 315 dimension from the outer circumferential edge of the rotor core 31, and an intersection 312$a$2 of the reference magnetic flux line and a side that is the other circumferential-end edge of the first hole 312A and is positioned away from the d axis by half the width of a bridge 316 set between the first hole 312A and the second hole 312B.

Similarly, a contour line 312Ba on the outer circumferential side of the second hole 312B which is the other one of the magnet holes in the second layer is formed to be an arc passing through a total of three intersections, i.e., an intersection 312$a$6 of a circumferential-center line of the second hole 312B and a reference magnetic flux line which is a magnetic flux line as a reference positioned inward by the same number of magnetic flux lines as set for the contour line 312Aa from the contour line 311$b$ on the inner circumferential side of the magnet hole 311 in the first layer, an intersection 312$a$4 of the reference magnetic flux line and a side that is a circumferential-end edge of the second hole 312B and is positioned inward by the bridge 315 dimension from the outer circumferential edge of the rotor core 31, and an intersection 312$a$5 of the reference magnetic flux line and a side that is the other circumferential-end edge of the second hole 312B and is positioned away from the d axis by half the width of the bridge 316.

A manner for forming contour lines on the inner circumferential side of the first hole 312A and the second hole 312B in the second layer is the same as in the case of the magnet hole 311 in the first layer, and therefore the description thereof is omitted.

As understood from the above, while the magnet hole in the second layer is divided into the first hole 312A and the second hole 312B, a total of the six intersections described above are positioned on the same reference magnetic flux line, and thus it is ensured that the contour lines of the magnet holes in the second layer are also along the magnetic flux lines of the d-axis magnetic flux. Therefore, as described above, magnet torque and reluctance torque can be efficiently obtained.

Four corners at ends of each magnet hole are rounded as necessary in consideration of a stamping process for a magnetic sheet, the mechanical strength in usage, etc.

Here, the intervals between the contour lines obtained as described above will be described. In FIG. 3, as indicated by thick bidirectional arrows on the d axis, in the case of indicating these intervals by the number of magnetic flux lines, these intervals are set to contain the same number of magnetic flux lines. That is, the number of magnetic flux lines distributed between the outer circumferential edge of the rotor core 31 and the magnet hole 311 in the first layer, the number of magnetic flux lines distributed between the contour line 311a on the outer circumferential side and the contour line 311b on the inner circumferential side of the magnet hole 311 in the first layer, the number of magnetic flux lines distributed between the magnet hole 311 in the first layer and the magnet hole 312 in the second layer, and the number of magnetic flux lines distributed between the contour line 312a on the outer circumferential side and the contour line 312b on the inner circumferential side of the magnet hole 312 in the second layer, are set to be equal to each other. In the example in FIG. 3, there are about 6.5 magnetic flux lines for each.

As described above in FIGS. 2(A) and 2(B), in the actual rotor core in which magnet holes are formed, a magnetic flux hardly flows in the magnet hole but the corresponding magnetic flux flows into the core portion. Therefore, as shown in FIG. 3, if the number of magnetic flux lines, i.e., the magnetic flux amount, obtained when the magnet holes are not formed is set to be the same between a portion corresponding to the magnet hole and the core portion, the amount of a magnetic flux flowing in the actual core portion is doubled and the magnetic flux density in the actual core portion is doubled.

In design of a rotary electric machine, normally, the magnetic flux density in a gap is set at a value close to 1T. As described in FIG. 3, if the number of magnetic flux lines in a portion corresponding to the magnet hole is set to be the same as the number of magnetic flux lines in the core portion, the magnetic flux density in the actual core portion has a value close to 2T.

Since the saturation magnetic flux density in the core portion is about 2T, the usage rate of the core increases, and thus efficient design of the rotary electric machine is achieved.

That is, if the number of magnetic flux lines in a portion corresponding to the magnet hole is less than the number of magnetic flux lines in the core portion, the core portion is still not magnetically saturated, and thus the core is not sufficiently utilized. In addition, due to the thickness reduction in the magnet hole, the inductance Ld in the d-axis direction does not decrease, and therefore reluctance torque is difficult to be obtained.

On the other hand, if the number of magnetic flux lines in a portion corresponding to the magnet hole is more than the number of magnetic flux lines in the core portion, the core portion is saturated when the magnet hole is provided, so that the magnetic flux is distorted to cause torque reduction or ripple.

Figure 4:
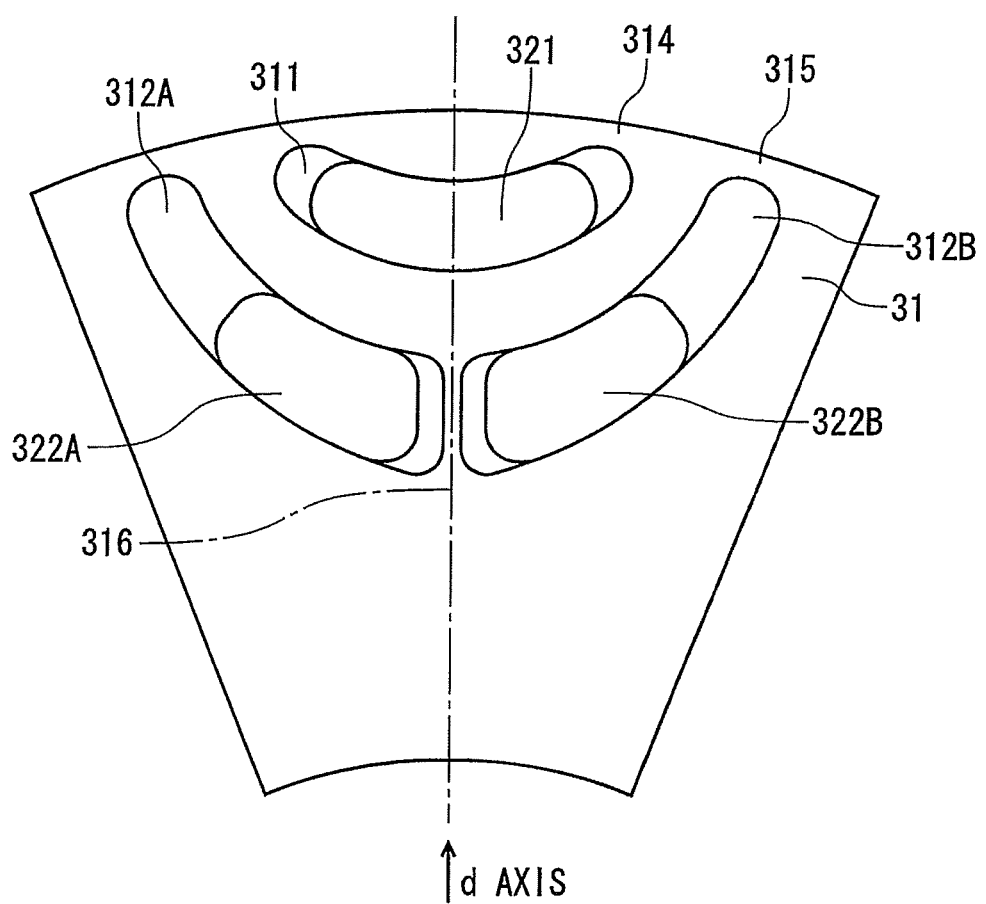
FIG. 4 is a sectional view for one magnetic pole showing magnet holes and permanent magnets inserted in the magnet holes, which are formed in the rotor core.

Next, permanent magnets inserted into the magnet holes will be described. FIG. 4 is a sectional view for one magnetic pole showing the magnet holes 311, 312A, and 312B and the permanent magnets 321, 322A, and 322B inserted in the respective magnet holes, which are formed in the rotor core 31.

As shown in FIG. 4, the contour line along the circumferential direction of each permanent magnet is formed to be matched with the contour line along the circumferential direction of the corresponding magnet hole to which the permanent magnet is inserted. Therefore, the contour line along the circumferential direction of each permanent magnet is also along the magnetic flux lines of the q-axis magnetic flux.

Since the permanent magnets also have arc shapes, the permanent magnets can be processed with low cost by a lathe or the like, as in the case of the magnet hole.

The widths in the circumferential direction of the permanent magnets 32 are set to be smaller than the widths in the circumferential direction of the magnet holes 310, so that the permanent magnets 32 do not fill up to the ends of the magnet holes 310 but there are predetermined gaps therebetween.

This is for preventing short-circuit due to leakage of a magnetic flux through the bridges 314 to 316 described above, and for preventing demagnetization of the permanent magnets 32 due to the q-axis magnetic flux and d-axis magnetic flux (when reluctance torque is utilized) generated by the stator 20.

Regarding the leakage of the magnetic flux, first, the bridges 314 to 316 will be described. The bridges serve to support the rotor 30 against a centrifugal force exerted when the rotor 30 rotates at a high speed. For example, in a motor that requires high-speed rotation as in an electric vehicle motor, a considerably great centrifugal force is exerted, and therefore the dimension of the bridge portion needs to be enlarged as much as possible, but this contradicts leakage of a magnetic flux (torque reduction).

As also shown in FIG. 4, for example, the four corners of the magnet hole are rounded to reduce the dimension of the bridge accordingly, whereby stress at the bridge portion is reduced and leakage of a magnetic flux is minimized.

Figure 5:
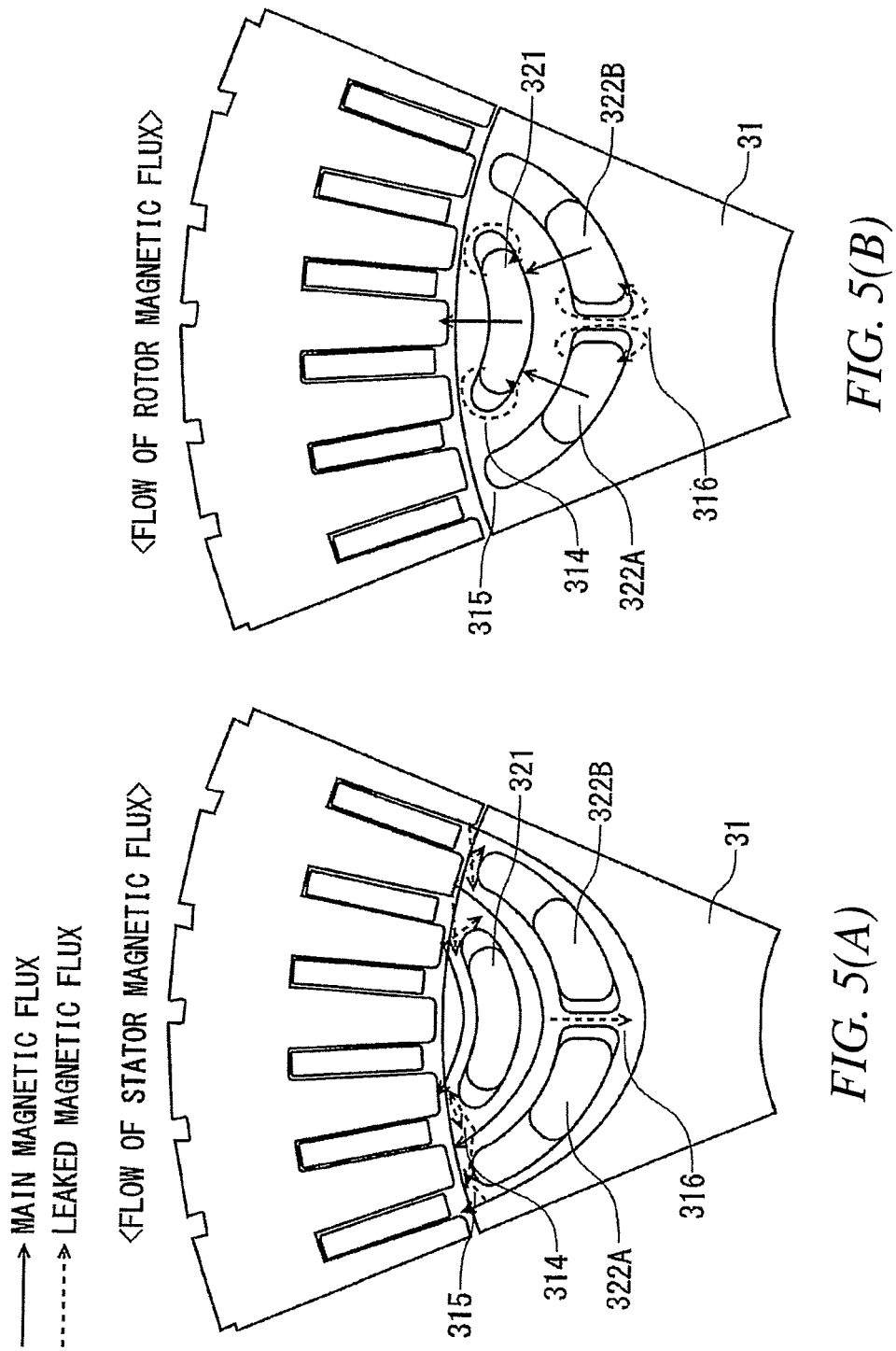
FIGS. 5(A) and 5(B) are diagrams for explaining flows and leaked magnetic fluxes of a stator magnetic flux (q-axis magnetic flux) and a rotor magnetic flux (d-axis magnetic flux).

FIGS. 5(A) and 5(B) show flows of a main magnetic flux and a leaked magnetic flux of each of the stator magnetic flux and the rotor magnetic flux. In FIGS. 5(A) and 5(B), a solid-line arrow indicates a main magnetic flux, and a dotted-line arrow indicates a leaked magnetic flux.

FIG. 5(A) shows flow of the stator magnetic flux (q-axis magnetic flux). As shown in FIG. 5(A), a part of a main magnetic flux flowing through the core portion in the first layer from the outer circumferential side of the rotor 30 leaks through the bridge 314 to the core portion in the second layer. A part of a main magnetic flux flowing through the core portion in the second layer leaks through the bridge 314 to the core portion in the first layer, through the bridge 315 to the core portion in the third layer, and through the bridge 316 to the core portion in the third layer. A part of a main magnetic flux flowing through the core portion in the third layer leaks through the bridge 315 to the core portion in the second layer.

Existence of these leaked magnetic fluxes leads to distortion of a magnetic flux, thus causing property deterioration without contributing to torque.

FIG. 5(B) shows flow of the rotor magnetic flux (d-axis magnetic flux). As shown in FIG. 5(B), a part of a main magnetic flux flowing from the outer circumferential side of the permanent magnet 321 in the first layer returns (short-circuits) through the bridge 314 to the inner circumferential side of the permanent magnet 321 in the first layer. A part of a main magnetic flux flowing from the outer circumferential side of the permanent magnet 322A, 322B in the second layer returns (short-circuits) through the bridge 316 to the inner circumferential side of the permanent magnet 322A, 322B in the second layer.

Due to existence of these leaked magnetic fluxes, the magnetic flux amount in the gap reduces accordingly, whereby torque reduces.

In order to reduce these leaked magnetic fluxes, as described above, predetermined gaps are provided between the ends of the permanent magnets 32 and the ends of the magnet holes 310, to create flux barriers.

Particularly, for the magnet hole 312 in the second layer, since the length thereof in the circumferential direction is long, in consideration of a centrifugal force during rotation, the magnet hole is divided into the pair of the first hole 312A and the second hole 312B which are symmetric with respect to the d axis at the center, to provide the bridge 316 therebetween.

In this case, the permanent magnets 322A and 322B inserted into the respective holes are located close to the d-axis side with respect to the center position in the holes.

Figure 6:
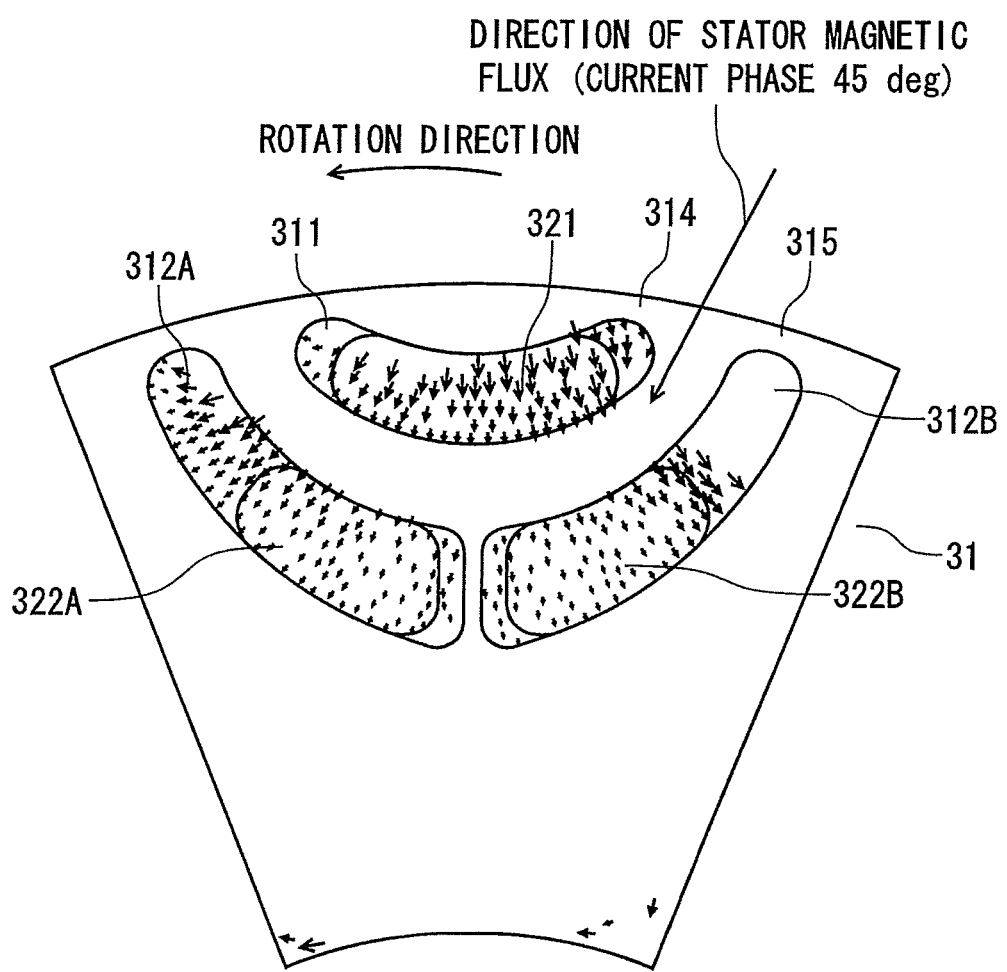
FIG. 6 is an analysis result showing distribution of a leaked magnetic flux generated by a stator.

FIG. 6 shows distribution of a leaked magnetic flux (a demagnetizing field to the magnet) generated by the stator 20. In FIG. 6, the rotation direction of the rotor 30 and the direction of the stator magnetic flux are also shown.

As is found from FIG. 6, in the case where the contour lines of the magnet holes are formed along the magnetic flux lines, the thickness (thickness in radial direction) of each magnet hole decreases with increase in the distance from the d axis, and along with this, the magnetic resistance reduces and the leaked magnetic flux increases.

In consideration of the above phenomenon, the permanent magnets 322A and 322B inserted into the first hole 312A and the second hole 312B are located close to the d-axis side with predetermined widths kept from the bridge 316.

Specific examples of materials used as the permanent magnets 32 include rare earth sintered magnets, rare earth bonded magnets, ferrite sintered magnets, ferrite bonded magnets, etc. However, generally, a magnet material having high coercivity is hardly demagnetized but the magnet cost increases.

In light of this, as examples of selection of materials for the plurality of permanent magnets 32, the following combinations are conceivable, which may be selected in accordance with their respective characteristics.

(1) Case where the permanent magnets in the first and second layers are made of the same material: since the materials are limited to a single type, the magnet cost reduces. Particularly, if a low-coercivity material is employed for both layers, the cost further reduces.

(2) Case where the coercivity of the magnet material in the first layer is set to be higher than the coercivity of the magnet material in the second layer: since demagnetization hardly occurs in the first layer, a wide and thin magnet can be used in the first layer (a magnet is demagnetized from an end and a thin portion thereof), so that magnet torque and reluctance torque are both increased.

(3) Case where the coercivity of the magnet material in the second layer is set to be higher than the coercivity of the magnet material in the first layer: since demagnetization hardly occurs in the second layer, wide and thin magnets can be used in the second layer so that the width of the magnet in the second layer becomes further wider than the width of the magnet in the first layer. Owing to the magnets in the second layer, magnet torque can be greatly increased.

(4) Case where a material having high coercivity is used for only the permanent magnet 322B inserted into the second hole 312B in the second layer: when armature current is flowed so as to maximize reluctance torque, the permanent magnet 322B inserted in the second hole 312B in the second layer is most likely to be demagnetized. Therefore, using a material having high coercivity for only this magnet provides a desired demagnetization effect while minimizing the magnet cost.

In the case where the magnet material is anisotropic, it is necessary to determine the magnetization direction of the magnet at the time of magnet molding, and in the case where the magnet material is isotropic, it is necessary to determine the magnetization direction of the magnet at the time of magnetization. Hereinafter, with reference to FIGS. 7(A) and 7(B), the magnetization direction (which may be referred to as an orientation direction) will be described.

In order to effectively derive magnet torque, as described above, it is desirable that the magnetic flux of the magnet is close to a sinewave. In the present embodiment 1, since the shape of each magnet hole is along the magnetic flux lines, that is, the q-axis magnetic flux has substantially a sinusoidal shape, if the magnet is oriented in a direction orthogonal to the shape of the magnet hole, the magnetic flux of the magnet becomes close to a sinewave. This is because a line orthogonal to this magnetic flux line also has a hyperbola shape having the d axis as asymptotes.

Figure 7A:
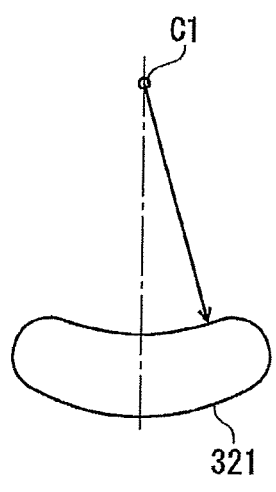
FIGS. 7(A) and 7(B) are diagrams for explaining the shape and orientation of each permanent magnet of the rotor.
Figure 7B:
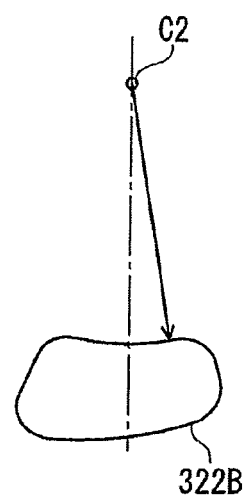

FIG. 7(A) shows the case of magnetizing the permanent magnet 321 in the first layer, and FIG. 7(B) shows the case of magnetizing the permanent magnet 322B inserted into the second hole 312B in the second layer.

As shown in the drawings, a parallel orientation is to perform magnetization in parallel with a line passing through the center point of an arc forming the contour line on the outer circumferential side of the permanent magnet, and the midpoint in the circumferential direction of the contour line, and a radial orientation is to perform magnetization in a direction passing through the center point of an arc forming the contour line on the outer circumferential side of the permanent magnet. Either of them may be selected.

Specifically, for the permanent magnet 321 in the first layer shown in FIG. 7(A), the center point C1 of the arc on the outer circumferential side which forms the contour line on the outer circumferential side of the permanent magnet serves as a point on the axis of the parallel orientation, and also serves as the pole center in the case of radial orientation.

Similarly, for the permanent magnet 322B in the second layer shown in FIG. 7(B), the center point C2 of the arc on the outer circumferential side serves as a point on the axis of the parallel orientation, and also serves as the pole center in the case of radial orientation.

Generally, in the case of radial orientation, torque is more likely to increase than in the case of parallel orientation. However, in the case where the width of the permanent magnet is small as in the present embodiment 1, a difference in torque between both cases is small, and therefore the parallel orientation in which manufacturing is easy may be employed.

Next, the assembly method for the rotor 30 will be briefly described. As in the case of the stator core 21, the rotor core 31 is formed of a plurality of stacked thin magnetic sheets. Thereafter, the permanent magnets are inserted into the magnet holes, and the resultant rotor core 31 is fitted to the rotary shaft 33, to form the rotor 30.

A group of the permanent magnets 32 may be inserted after each of them has been individually magnetized, or may be magnetized by a magnetizer after these magnets have been inserted into the magnet holes.

In the case of the latter magnetization method, handling of the permanent magnets in assembly is easy and all the magnetic poles can be magnetized at once. Therefore, the productivity is improved. In the case of the magnet shape (an angle in the rotation direction formed by the group of permanent magnets 32 is smaller than an angle for one magnetic pole) in the present embodiment 1, each permanent magnet is likely to be magnetized up to the ends thereof, so that unevenness of magnetization of the permanent magnet hardly occurs.

As a method for positioning the permanent magnet in each magnet hole, any method such as providing a protrusion at a part of the magnet hole, filling the gap in the magnet hole with resin, or inserting a nonmagnetic pin may be used.

FIG. 8 is a graph showing comparison of torque and torque ripple of a rotary electric machine between the case of using the rotor 30 in embodiment 1 of the present invention and the case of using a conventional rotor.

The conventional example shows the case of employing a rotor having a shape shown in Patent Document 2, which is the same as in the present invention in that the magnet holes are formed in arc shapes.

As the torque, a value per unit magnet volume (i.e., magnet usage rate) is indicated. It is found that the present invention has an excellent property in terms of both of torque and torque ripple.

Thus, in the rotary electric machine according to embodiment 1 of the present invention, the contour line along the circumferential direction of the magnet hole 310 in a cross section perpendicular to the rotary shaft 33 of the rotor 30 is formed to be an arc passing through three intersections at which one of magnetic flux lines of the q-axis magnetic flux intersects with the circumferential-center line and both end sides in the circumferential direction of the magnet hole 310. Therefore, processing of the magnet holes 310 and the permanent magnets 32 to be inserted to the magnet holes 310 is facilitated and simplified, so that the cost reduces. In addition, since the contour line has a shape along a magnetic flux line at the above three points which are distributed over the entire circumferential region of the magnet hole 310, a high torque property that is almost equal to that in the case where the contour line is formed in a shape completely along a magnetic flux line is obtained, and torque ripple also reduces.

Embodiment 2

In the present embodiment 2, a configuration for further reducing torque ripple of the rotary electric machine in the above embodiment 1 will be described. As means for reducing torque ripple, an example in which a rotor is skewed is conventionally known. In the present embodiment 2, a step-skew structure is employed in which the rotor is divided into a plurality of steps and the position of the magnetic pole center at each step is shifted.

Figure 9:
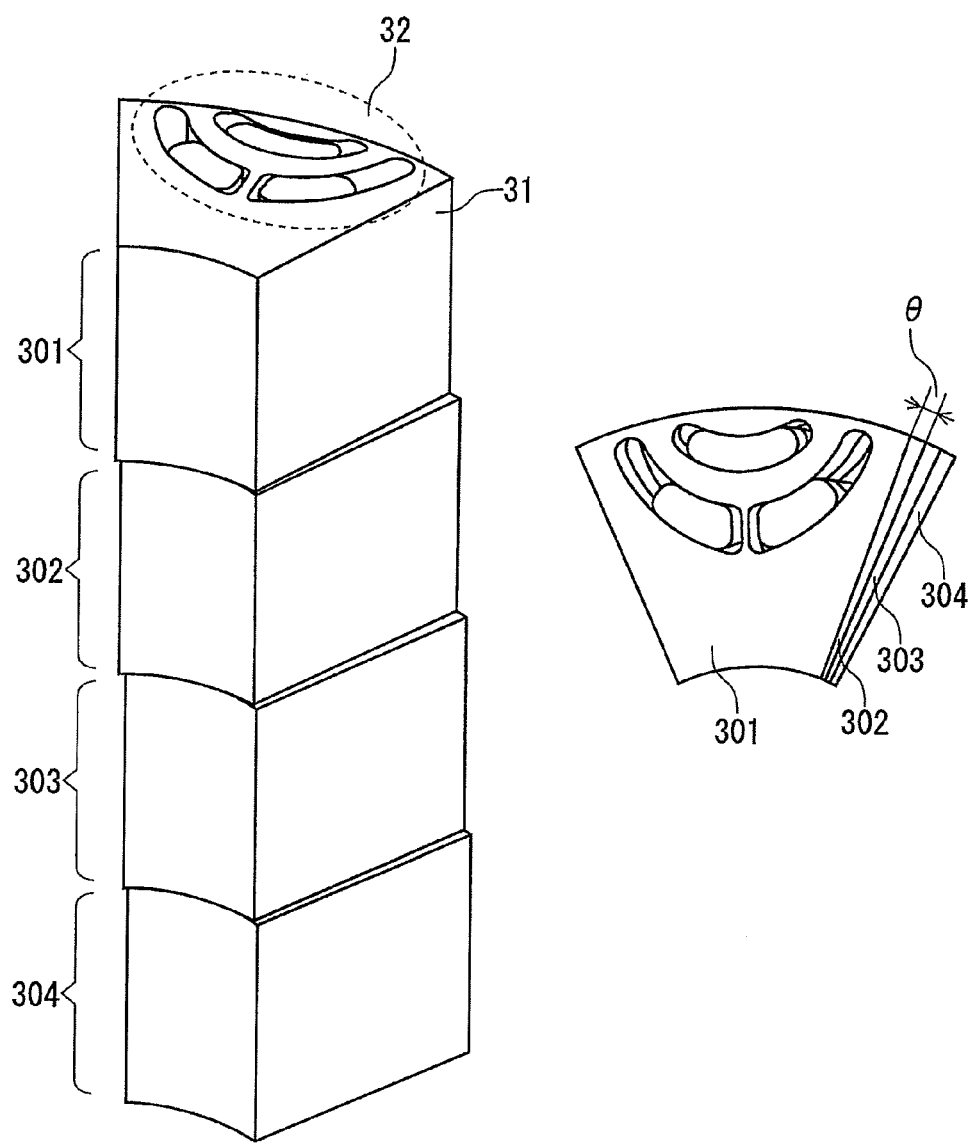
FIG. 9 is a perspective view showing a rotor according to embodiment 2 of the present invention.

FIG. 9 is a perspective view for one magnetic pole showing the rotor 30 according to the present embodiment 2, and a sectional view thereof along a direction perpendicular to the axial direction. In this case, the rotor 30 is divided into four steps of rotor blocks 301 to 304 along the axial direction, but is not limited to four steps. Each block is skewed by the same angle θ per step, so that the rotor block 304 at the fourth step is skewed by an angle of (4−1)×θ degrees relative to the rotor block 301 at the first step.

Here, the skew angle will be described. In a normal rotary electric machine (for which eccentricity, or deformation of a stator or a rotor is not considered), generally, torque ripples having frequencies (hereinafter, denoted by 6f, 12f, . . . , 24f) that are six times, twelve times, . . . , twenty-four times as high as an operation frequency f occur. The operation frequency corresponds to the number of pole pairs.

These values are mainly attributed to harmonics of magnetic fluxes generated by a field system and an armature. In a normal rotary electric machine, odd-number components (fifth order, seventh order, eleventh order, thirteenth order, etc.; in the case of three phases, multiples of three may be neglected) of harmonics mainly occur, and torque ripples of 6f, 12f, . . . , 24f as described above occur due to multiplication between the odd-number harmonics of the field system and a fundamental wave of the armature.

On the other hand, a skew angle α for cancelling torque ripple that is an m×f component (m is an integer) is calculated as α that satisfies the following expression.

$$\text{Skew factor} = \sin(m\alpha/2)/(m\alpha/2) = 0$$

The skew angle θ per step is calculated as α/number of steps.

Figure 11:
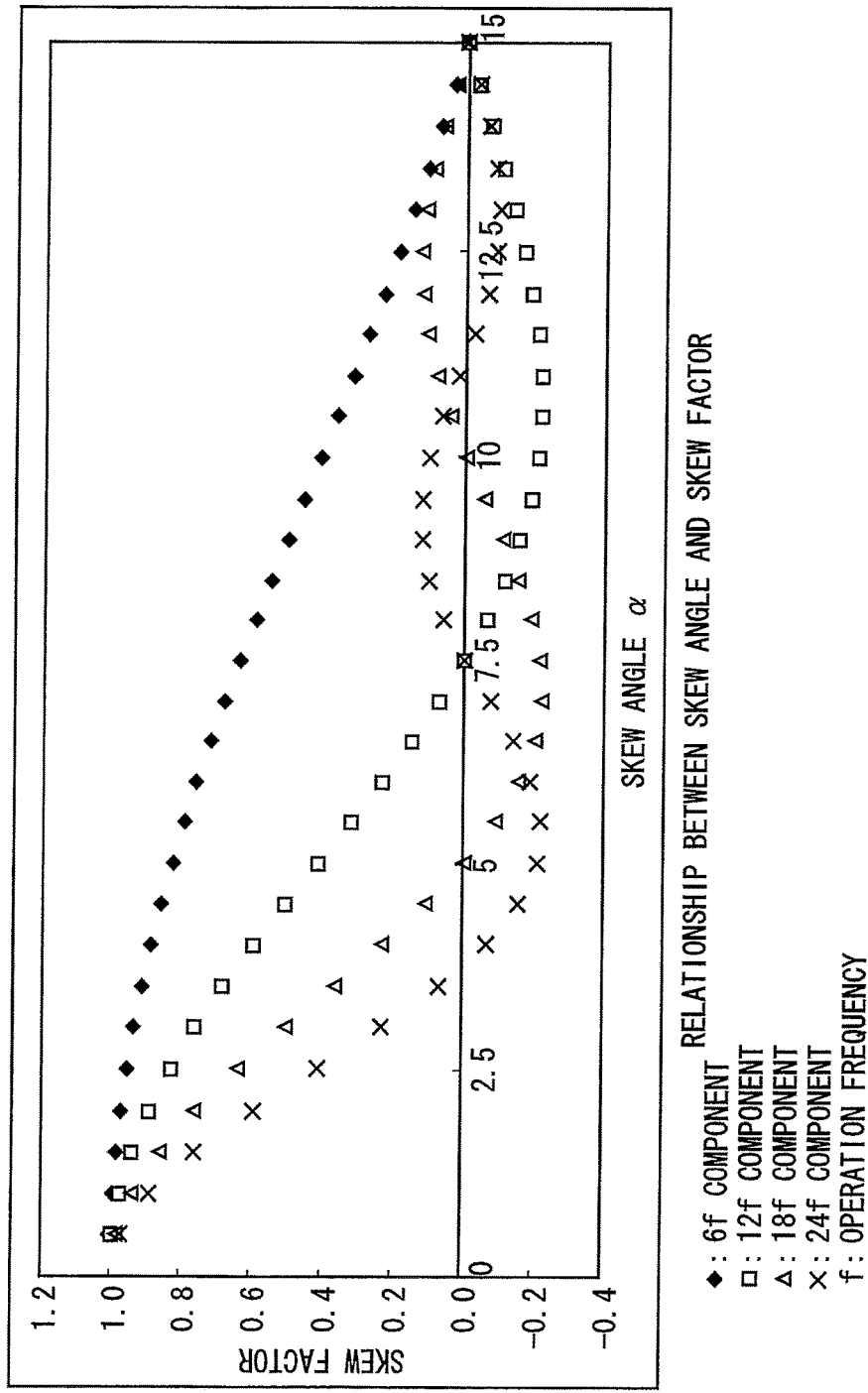
FIG. 11 is a diagram showing the relationship between a skew angle and a skew factor.

FIG. 11 is a graph showing the relationship between the skew angle and the skew factor. From FIG. 11, the skew angle α=7.5 degrees at which a 12f component and a 24f component are suppressed is read, and then from this, the skew angle θ per step=7.5/4=1.875 degrees is obtained.

The skew angle α is a theoretical value. Actually, due to, for example, leakage of a magnetic flux in the axial direction at a joint part between the rotor blocks at the respective steps, the optimal angle that minimizes the ripple may be shifted from the above value. Therefore, the skew angle α may be determined based on experimental values, analytical values, or the like.

Next, an example of the method for assembling the rotor 30 in the present embodiment 2 will be described, regarding the case of the rotor blocks 301 to 304 at four steps.

The rotor block at each step is formed of a plurality of stacked thin magnetic sheets, as in embodiment 1. The rotor blocks may be provided with key ways, positioning holes, or the like which are shifted from each other by the angle θ. The permanent magnets that have not been magnetized yet are inserted into the rotor block at each step, and then the rotor blocks 301 to 304 at the first to fourth steps are sequentially fitted to the rotary shaft. The fitting method may be press fitting, shrink fitting, or the like. The skew angle may be adjusted by positioning with the key way and a key, insertion of a positioning pin into the positioning hole, or the like.

After formation of the rotor 30, the rotor 30 is inserted into a magnetizer, to magnetize the group of permanent magnets 32. In the case of the rotor 30 in the present embodiment 2, if an angle θ1 (for example, in FIG. 4, corresponding to the angle between the left end of the permanent magnet 322A and the right end of the permanent magnet 322B in the second layer) formed in the rotation direction by the group of permanent magnets 32 satisfies the following expression, magnetization for all the steps can be performed at once by a normal magnetizer 40 composed of a magnetization yoke 41 and a magnetization coil 42 as shown in FIG. 10.

$$\theta_1 \leq \text{magnetic pole angle} - \theta \times (\text{number of steps}-1) = \text{magnetic pole angle} - \theta_{n-1}$$

If the angle θ1 does not satisfy the above condition, an end portion at the uppermost step or the lowermost step enters the adjacent magnetic pole area in the magnetizer 40, and the magnetization direction thereof is inverted.

Figure 10:
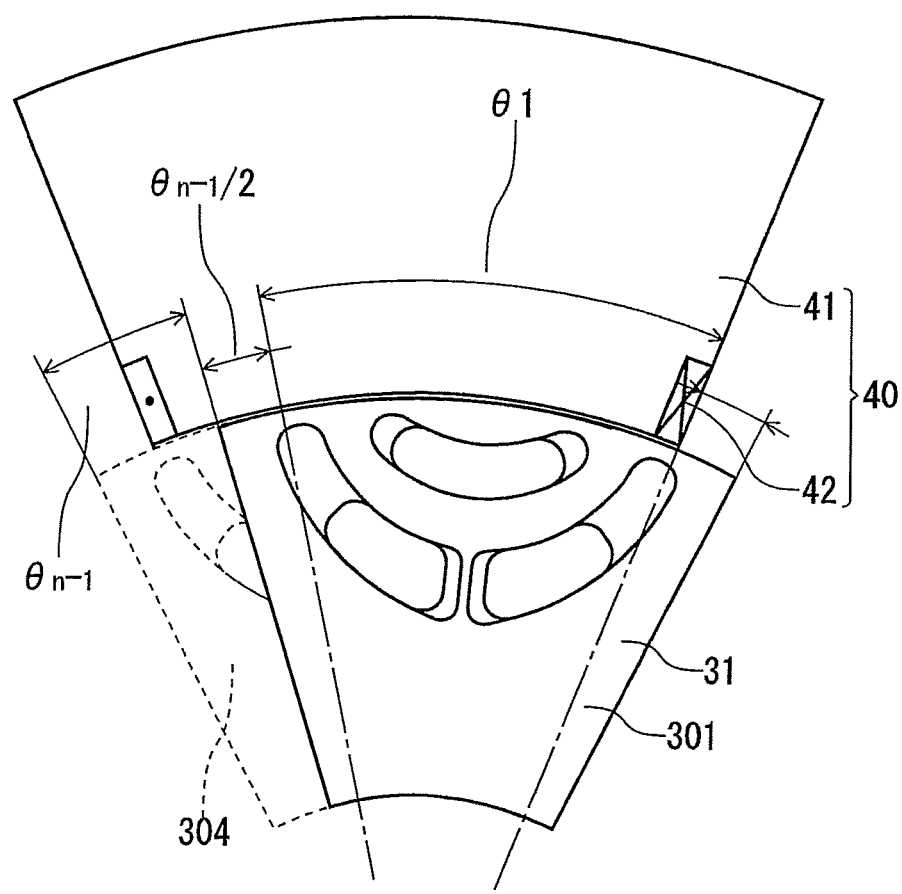
FIG. 10 is a diagram showing the positional relationship of cores at the uppermost stage and the lowermost stage, which compose the rotor shown in FIG. 9, and a relationship with a magnetizer, as seen from the rotation axis direction.

FIG. 10 is a diagram showing the positional relationship between the rotor blocks at the uppermost step 301 and the lowermost step 304 in the case of providing step-skew with an angle (α=15 degrees, θ=3.75 degrees; see FIG. 11) for suppressing 6f-component ripple, in which case the skew angle α is maximized. As shown in FIG. 10, the above expression is satisfied, and therefore magnetization can be performed by the magnetizer 40.

Thus, if magnetization can be performed by one magnetizer 40 after the assembly, a working time taken for the magnetization can be shortened, and the rotor 30 can be easily obtained.

Figure 12:
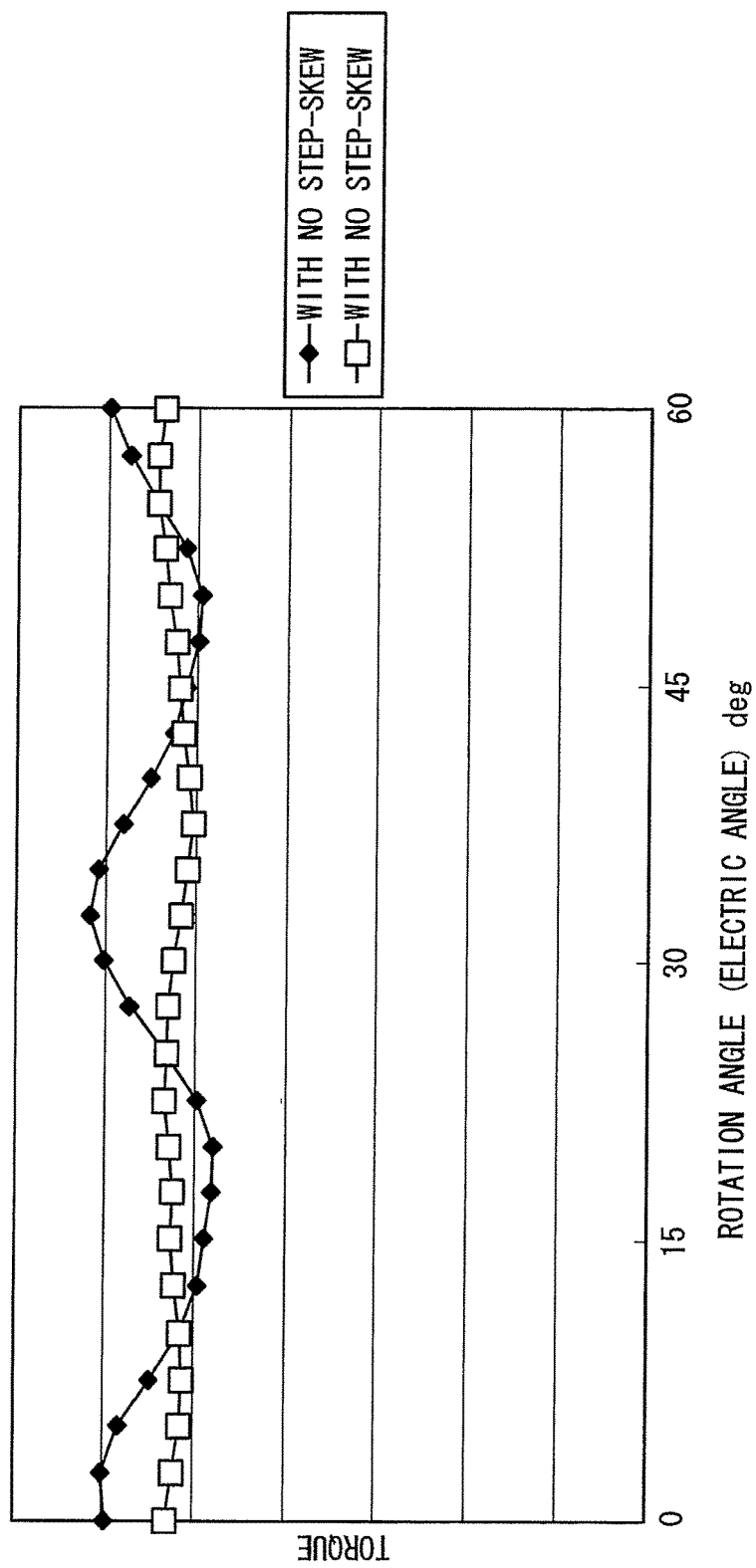
FIG. 12 is a graph showing an effect of reducing torque ripple in a rotary electric machine according to embodiment 2 of the present invention.

FIG. 12 shows torque waveforms of the rotor (with no step-skew) in the present embodiment 1 and the rotor (with step-skew, θ=1.875 degrees) in the present embodiment 2. It is found that, in the case of no step-skew, one crest of torque ripple per 30 degrees in electric angle, i.e., 12f-component torque ripple mainly occurs, but in the case of providing step-skew, torque ripple can be greatly reduced.

Thus, in the rotary electric machine according to embodiment 2 of the present invention, the contour line of each magnet hole is formed in an arc shape along a magnetic flux line at three points distributed over the entire circumferential region of the magnet hole, and the rotor core 31 is composed of the plurality of rotor blocks 301 to 304 which are divided along the axial direction and skewed from each other by the skew angle θ. Therefore, torque ripple can be minimized using a comparatively small skew angle, and a high torque property can be maintained.

It is noted that, within the scope of the present invention, the above embodiments may be freely combined with each other, or each of the above embodiments may be modified or abbreviated as appropriate.

INDUSTRIAL APPLICABILITY

The rotary electric machine of the present invention has a high torque property, and is preferably applicable to products that severely require torque ripple reduction, such as an electric vehicle motor, an on-vehicle motor of an EPS or the like, and an industrial servomotor.

The invention claimed is:

1. A rotary electric machine comprising a stator and a rotor, wherein
the rotor includes a rotor core having a plurality of magnetic poles formed by inserting permanent magnets into magnet holes formed at regular intervals in a circumferential direction, and
in the case where a magnetic flux flowing along a d axis corresponding to a direction of a center line of each magnetic pole is defined as a d-axis magnetic flux, and a magnetic flux flowing along a q axis corresponding to a direction of a center line between the magnetic poles is defined as a q-axis magnetic flux, a contour line along the circumferential direction of each magnet hole in a cross section perpendicular to a rotation axis of the rotor is formed to be an arc passing through three intersections at which one of magnetic flux lines of the q-axis magnetic flux intersects with a circumferential-center line and circumferential-end sides of the magnet hole,
wherein the magnet hole includes a plurality of magnet holes formed along a radial direction of the rotor, such that the number of magnetic flux lines of the q-axis magnetic flux calculated when the magnet holes are not formed in the rotor core is the same among: a part between an outer circumferential edge of the rotor core and the magnet hole formed on a radially outermost side; a part between a contour line on a radially outer side and a contour line on a radially inner side of each formed magnet hole; and a part between the magnet holes adjacent to each other in a radial direction, wherein the permanent magnet inserted in each magnet hole has four rounded corners, and a radially innermost magnet hole being divided by a bridge, the permanent magnets arranged in the radially innermost magnet holes being spaced apart from the bridge.

2. The rotary electric machine according to claim 1, wherein the magnet hole includes a pair of a first hole and a second hole which are symmetric with respect to the d axis, such that the three intersections of the first hole and the three intersections of the second hole are located on the same magnetic flux line.

3. The rotary electric machine according to claim 1, wherein
the permanent magnet inserted in each magnet hole is formed such that a contour line along the circumferential direction of the permanent magnet in a cross section perpendicular to the rotation axis of the rotor is matched with the contour line along the circumferential direction of the magnet hole, and a width in the circumferential direction of the permanent magnet is smaller than a width in the circumferential direction of the magnet hole.

4. The rotary electric machine according to claim 3, wherein the magnet hole includes a pair of a first hole and a second hole which are symmetric with respect to the d axis, such that the permanent magnets inserted in the first hole and the second hole are located close to the d-axis side with respect to a circumferential center.

5. The rotary electric machine according to claim 3, wherein a magnetization direction of each permanent magnet is parallel with a line passing through: a center point of an arc forming the contour line on a radially outer circumferential side of the permanent magnet; and a midpoint in the circumferential direction of the contour line.

6. The rotary electric machine according to claim 3, wherein a magnetization direction of each permanent magnet is a radial direction passing through a center point of an arc forming the contour line on a radially outer circumferential side of the permanent magnet.

7. The rotary electric machine according to claim 1, wherein
the rotor core is composed of a plurality of rotor blocks divided along an axial direction thereof, and the rotor blocks adjacent to each other are skewed from each other by a skew angle θ in a rotation direction.

8. The rotary electric machine according to claim 7, wherein the following expression is satisfied:

$$\theta_1 \leq \text{magnetic pole angle} - (n-1) \times \theta,$$

where θ1 is an angle formed in the rotation direction by each permanent magnet included in each single rotor block, the magnetic pole angle is a value obtained by dividing 360 degrees by the number of magnetic poles of the rotor, and n is the number of steps of the rotor blocks.

* * * * *